Aug. 11, 1931.  E. C. McALEES  1,818,858
ADAPTABLE PIPE FITTING
Filed Oct. 30, 1926

INVENTOR.
Edward C. McAlees
BY *Westall and Wallace*
ATTORNEYS.

Patented Aug. 11, 1931

1,818,858

UNITED STATES PATENT OFFICE

EDWARD C. McALEES, OF LOS ANGELES, CALIFORNIA

ADAPTABLE PIPE FITTING

Application filed October 30, 1926. Serial No. 145,209.

This invention relates to a device for connecting pipes of different sizes, and pertains more especially to a pipe coupling device which is adapted to tightly grip one of the pipes which may vary in size between certain limits.

The present invention is especially adaptable for use with vent pipes for heaters. It is the practice to vent hot water heaters employing fuel such as gas. This is done by extending the vent pipe through an opening in the roof. A flashing of hood form is then placed over the vent pipe whereby to provide against leakage of rain and water. Such devices as now commonly constructed have objectionable space left within the hood and over the upper edges of the vent pipe through which flames and hot gases may pass. Due to this, there is danger of the flames coming in contact with the roof at the edges of the vent pipe opening and causing a conflagration.

It is the primary object of this invention to provide an adapter for attachment to the end of the vent pipe section extending through the roof and to serve for connection to a pipe section forming a part of the vent flashing. The invention resides more particularly in the adapter and its features of construction, whereby it may be accommodated to vent pipes of various sizes.

Figure 1:
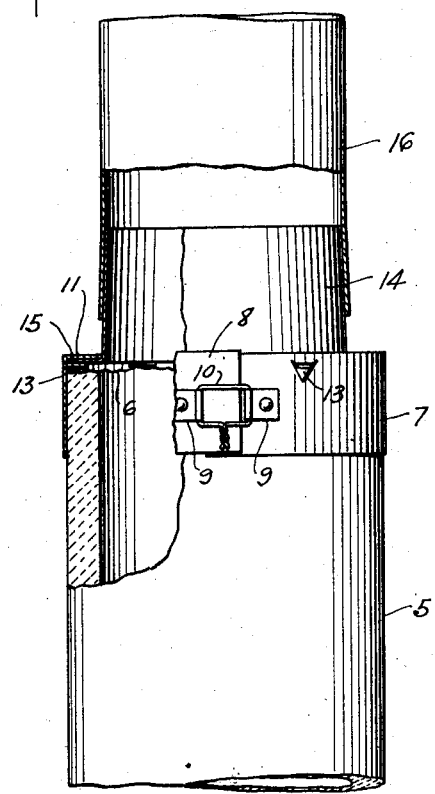
Figure 3:
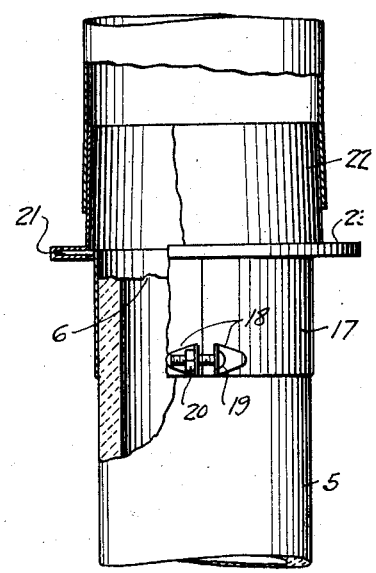
Figure 2:
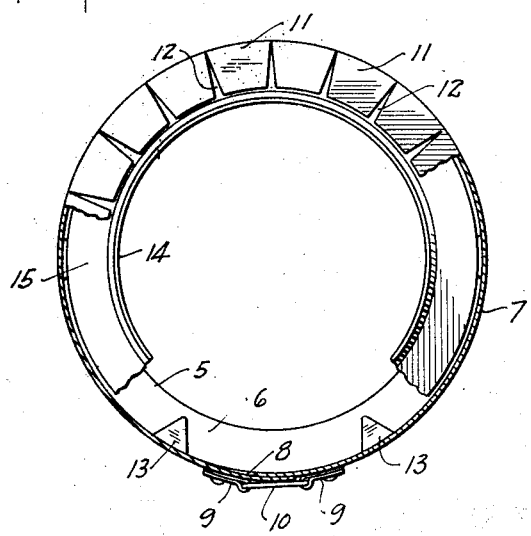
Figure 4:
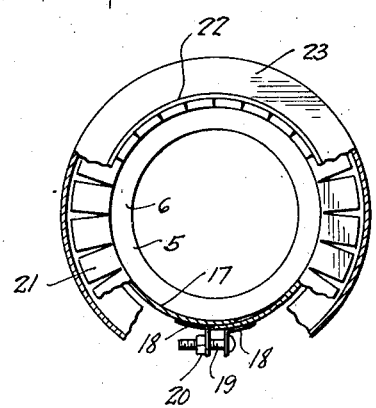

These objects, together with other objects and corresponding accomplishments are obtained by means of the embodiment of my invention illustrated in the accompanying drawings, in which:

Fig. 1 is an elevation with a portion in section showing one embodiment of my invention; Fig. 2 is a plan view partly in section of the structure shown in Fig. 1; Fig. 3 is an elevation partly in section of another embodiment of my invention; and Fig. 4 is a plan view partly in section of the structure shown in Fig. 3.

Referring with more particularity to Figs. 1 and 2, a vent pipe 5, which is preferably formed of baked clay and is of the same character as what are generally known as sewer pipes is shown. This pipe when used as a vent for heaters, extends through a hole in the roof of a building and may have a rough upper edge as indicated by 6. This edge is due to breaking of the pipe in obtaining the proper length. This pipe forms no part of the present invention per se. A sleeve of sheet metal 7 is split or divided so that one end may overlap another as indicated by 8 to form a complete sleeve. Straps 9 are secured to the ends of the sleeve and are provided with eyes through which a wire 10 or any suitable fastening device may be passed to cause the sleeve to snugly hug the pipe 5. A flange 11 is inturned at the top and radially slit as indicated by 12 to provide a flange which will accommodate itself to variations in diameter of pipe 5. Triangular tongues 13 are upset from the sleeve adjacent the flange so as to lie parallel to the flange 11, being spaced therefrom and serving as a support for the sleeve as it rests upon the edge of the pipe 5. The spaces between the tongues and flange serves as a channel to receive the flange of a cooperating pipe member.

This member comprises a sleeve 14 fixed in diameter and having an outstanding flange 15 which will be received in the spaces between tongues 13 and flange 11. The sleeve section 14 is adapted to form a slip on connection with the metallic pipe 16, forming a continuation of the rest.

The installation is obvious from the construction just described. The structure is such as to adapt the pipe 5 to connection to the pipe 16 and form a continuous passage.

In Figs. 3 and 4, a split sleeve 17 is provided having lugs 18 fastened together by a bolt 19 and nut 20. There is an outstanding slit flange 21. This section of the adapter is connected to the pipe 5 as shown in Fig. 3. The other section comprises a sleeve 22 of the slip on type having an outstanding flange 23 provided with a return portion so as to provide a channel or pocket within which flange 21 is received. Obviously the diameter of sleeve 18 may be varied and still provide a tight fit with the sleeve 22.

What I claim is:

An adapter comprising a sleeve divided longitudinally so as to have overlapping ends whereby the sleeve may be accommodated to mounting on a pipe, adjustable means to fasten the ends of said sleeve together, said sleeve having a laterally turned flange radially slit to permit adjustment of the diameter of said sleeve, and a pipe section having a fixed outstanding flange U-shape in cross section interlocking with the slit flange to hold the sleeve and pipe section against separation.

In witness that I claim the foregoing I have hereunto subscribed my name this 18th day of October, 1926.

EDWARD C. McALEES.